United States Patent [19]

Wichelhaus et al.

[11] Patent Number: 5,107,069

[45] Date of Patent: Apr. 21, 1992

[54] ADHESION PROMOTER

[76] Inventors: Jürgen Wichelhaus, Egenstrasse 60, D-5600 Wuppertal; Johannes, Andres, Bonner Strasse 14, D 4000 Düsseldorf, both of Fed. Rep. of Germany; Serge Rebouillat, Airans.Farges, F-01550 Collonges.Fort L'Ecluse, France; Werner Gruber, Franz-Karl-Kremer-Strasse 7, D-4052 Korschenbroich, Fed. Rep. of Germany

[21] Appl. No.: 431,029

[22] Filed: Oct. 27, 1989

[30] Foreign Application Priority Data

Oct. 29, 1988 [DE] Fed. Rep. of Germany ....... 3912626
Apr. 18, 1989 [DE] Fed. Rep. of Germany ....... 3836924

[51] Int. Cl.$^5$ .............................................. C08G 69/46
[52] U.S. Cl. .................................... 524/314; 524/315; 524/321; 525/301; 525/304; 525/308; 525/309; 427/393.5; 428/378
[58] Field of Search ....................... 524/314, 315, 321; 525/301, 304, 308, 309; 427/393.5; 428/378

[56] References Cited

U.S. PATENT DOCUMENTS

| 4,336,171 | 6/1980 | Kohlstadt | 524/510 |
| 4,483,962 | 7/1983 | Sadowski | 524/552 |
| 4,557,967 | 11/1983 | Willemsen | 428/224 |
| 4,720,398 | 3/1985 | van Aalten | 427/208.2 |

FOREIGN PATENT DOCUMENTS

| 161373 | 11/1985 | European Pat. Off. . | |
| 0922582 | 4/1963 | United Kingdom | 524/321 |

Primary Examiner—Maurice J. Welsh
Assistant Examiner—Rachel Johnson

[57] ABSTRACT

Described are heat-activatable promoters for treating the surfaces of metals or synthetic materials (plastics) prior to bonding, containing
  from 0.1 to 10% by weight of a carbonyl compound having at least one activated double bond,
  from 5 to 30% by weight of a polymer having functional groups,
  from 0 to 10% by weight of further auxiliary materials, as well as
  one or more organic solvent(s) to make 100% by weight.

The invention further relates to a process for producing the heat-activatable adhesion promoter and the use thereof for the surface treatment of polymer fibers.

17 Claims, No Drawings

ADHESION PROMOTER

The invention relates to a new adhesion promoter (primer) based on a carbonyl compound having at least one activated double bond and a polymer having functional groups, said adhesion promoter being useful for increasing the bonding strength of adhesives to metal surfaces difficult to bond such as, e.g., surfaces of non-ferrous metals, galvanized or chromated sheets or aluminum, and a process for preparing said adhesion promoter.

The invention further relates to the use of such an adhesion promoter on polymers, more particularly on polymer fibers.

In adhesion-bonding of metals difficult to bond it is conventional to employ adhesion promoters, often called primers. This is applicable, more particularly to the use of hot melt adhesives.

Known adhesion promoters are, for example, isocyanate-based products having a high content of isocyanate groups and also organofunctional silanes or siloxanes. In both cases highly reactive compounds are involved which require particular care during preparation, storage and use. Moreover, also these adhesion promoters exhibit only a limited efficiency, particularly upon use with non-ferrous metals or metals with improved surfaces. For example, very great difficulties are encountered with copper.

The coating of polymers, and more particularly of fibers with such a surface treatment agent leads to an improved processability of the fibers, that is particularly of high modulus fibers which are per se difficult to process such as aromatic polyamide fibers and the like. Furthermore, the surface treatment agent results in an improved compatibility of the fibers with a matrix in which the fibers are embedded and to an improved composite strength.

Within the scope of the invention fibers are understood to be continuous filaments, staple fibers, fiber tows, combined twisted surface-treated fibers, pulps, yarns and the like, but also flat textile fabrics, be they woven, knitted or by other means bonded, e.g. as non-wovens.

For the treatment of fibers, for example of aromatic polyamid fibers, epoxide resin preparations or other resins as well are used in the art. Such preparations have been described, for example, in the U.S. Pat. No. 4,557,967 and No. 4,652,488. The use of such surface treatment agents often results in a deterioration of the processability thereof and an increase in the water absorption and susceptibility to water. As a result, in subsequent textile processing steps, such as knitting or weaving, fibrillation and deposition occurs.

It is the object of the invention to provide a new adhesion promoter system which is heat-activatable, while otherwise it may be stored without giving rise to problems.

It is another object of the present invention to provide the use of an adhesion promoter for the surface treatment of fibers, and more particularly of polyamide fibers, and especially aromatic polyamides. The fibers coated thereby exhibit an improved textile processability and a reduced water absorption. It is still another object of the invention to provide a process for the preparation of coated fibrous polyamides wherein coating with the surface treatment agent may be carried out on the never dried fiber (on line) or on the dried fiber (off line).

Thus, subject matter of the invention is a heat-activatable adhesion promoter for treating the surfaces of metals or synthetic materials (plastics) prior to bonding, which adhesion promoter contains
from 0.1 to 10% by weight of a carbonyl compound having at least one activated double bond,
from 5 to 30% by weight of a polymer having functional groups,
from 0 to 10% by weight of further auxiliary materials, as well as
one or more organic solvent(s) to make 100% by weight.

The term "carbonyl compounds having at least one activated double bond" is understood to mean those carbonyl compounds wherein the double bond is present in conjugation with the carbonyl group. In a broad embodiment of the invention, these are $\alpha,\beta$-unsaturated carboxylic acids and the nitriles, amides, esters and/or anhydrides thereof, wherein said acids also may bear alkyl groups, carboxyl groups or other substituents.

Among these compounds, unsaturated dicarboxylic acids are preferred wherein at least one carboxylic group is conjugated with the double bond, and among the latter so are in turn the esters and/or semi-esters of such carboxylic acids.

Particularly preferred compounds are esters and/or semi-esters of maleic acid, crotonic acid, itaconic acid, fumaric acid and/or cyclohex-4-ene-1,2-dicarboxylic acid with a primary or secondary alcohol, and especially with a primary $C_1$-$C_6$ alcohol.

The most beneficial results have so far been obtained with products like that formed by dissolving maleic anhydride in $C_1$-$C_6$ alcohols, preferably at boiling temperature and residence times of up to 2 hours.

Particularly preferred among these products are the reaction products formed upon dissolution of maleic anhydride in isopropanol at the boiling point of the isopropanol during reaction times of from 0.5 to 2 hours, i.e. mixtures of esters and/or semi-esters of maleic acid and of isopropanol. In typical preparations according to the invention the carbonyl compound having at least one activated double bond is present in amounts of from 0.1 to 8% by weight.

The adhesion promoters according to the invention contain a polymer having functional groups as a further component. Here suitable are film-forming polymers having carboxylic acid, amino and/or hydroxyl groups; the term "polymer" as used herein is understood to include polycondensates, polyadducts and polymers. Typical suitable polycondensates are polyesters, polyamides, polyetheramides, polyesteramides. Typical polyadducts are polyethers or polyurethanes. Typical suitable polymers are polyacrylates, polymethacrylates and/or polyvinylesters and/or the copolymers thereof with others or with themselves.

Among said polymers the polycondensates are preferred, and so are among these the polyamides and the polyesteramides and polyetheramides. Particularly preferred are polyamides based on dimerized fatty acids. However, functionalized polymers such as amine-terminated polyethers, OH-terminated polyesters and the like can also be used.

The artisan, when selecting a suitable polymer, at all events has to pay attention to the solubility. If an ester is employed as the carbonyl compound having an activated double bond, then it is preferred to dissolve the polymer in that alcohol which has been employed in esterifying or partially esterifying the carboxylic acid which the carbonyl compound is derived from.

The polyamides based on dimer fatty acids within the scope of the invention are understood to mean polyamides in composing of which the dimer fatty acid has been used as one of the polyfunctional acid components or wherein dimer fatty acid-diamine has been employed as one of the polyfunctional amine components.

Polyamides based on dimer fatty acids in general consist of difunctional dicarboxylic acids which may also contain limited amounts of monofunctional proportions, on the one hand, and of difunctional amines, on the other hand. In addition to or in the place of dimer fatty acid there are still used aliphatic or aromatic dicarboxylic acids having from 2 to 20 carbon atoms as the difunctional carboxylic acids. As the diamines there are employed aliphatic or cycloaliphatic diamines having from 2 to 36 carbon atoms and each having 2 primary amine groups or one primary amine group and one secondary amine group or 2 secondary alkyl-substituted amino groups. Moreover, also suitable are polyamides having at least one polyetherdiamine as the diamine. According the invention, there can be used not only individual polyamides based on dimer fatty acids, but also mixtures thereof.

Suitable dimer fatty acid-based polyamides have been described in DE 31 11 226, DE 31 11 206, DE 35 31 941, DE 35 35 732, DE 35 04 804, DE 37 25 486, and DE 38 03 524.

Preferred polyamides according to the invention exhibit an excess of amino groups and, thus, have a residual amine value of between 1 and 40, and preferably between 2 and 9. This is particularly applicable to the above-mentioned polyamides derived from dimer fatty acids. Moreover, the polyamides employed according to the invention may also have an acid value of between 0.1 and 5, and preferably between 0.1 and 3.

Very favourable results were achieved with polyamides of the kind mentioned which show the following compositions:

a) Polyamides from dimer fatty acid and short-chain dicarboxylic acids and diamines;
b) Dimer fatty acid block copolyamides comprising polyether blocks; and
c) Dimer fatty acid block copolyamides comprising polyester blocks; the latter term is understood to mean polyamides in the compositions of which polyesters having terminal carboxylic acid groups and/or alkanolamines are involved.

The solvents used according to the invention are organic solvents. They are selected so that they will dissolve the carbonyl compound, on the one hand, and the polymer, on the other hand.

It is often preferred to use alcohols as solvents, and more particularly those alcohols as present as the esterifying constituent of the carbonyl compound if said carbonyl compound is an ester. To improve film formation, aliphatic or aromatic solvents may then be added, especially hydrocarbons, the boiling points of which are higher than those of the alcohols. Thus, for example, a solvent mixture of isopropanol/toluene may be employed. Toluene, however, may also be replaced therein by xylene or aliphatic hydrocarbons having boiling points within the appropriate temperature range, as long as the dissolving property will not be adversely affected thereby. The term "solution" here is understood to include not only physical solutions in the more stringent meaning, but also those preparations wherein one component is fully or partially present only in the suspended or swollen state.

In addition, the adhesion promoters according to the invention may contain further auxiliary materials. Suitable further auxiliary materials are stabilizers, antioxidants, dyes, plasticizers or also further non-functionalized polymers for the purpose of improving the adhesion to specific substrates compatible therewith. However, in any event the criterion for selecting those materials is the solubility thereof, i.e. they must be soluble in one solvent or solvent mixture together with said polymers having functional groups and said carbonyl compound.

In order to prepare suitable adhesion promoters, the artisan will dissolve the individual components, in any order, in the solvent or the solvent mixture. In the case that an ester is chosen as the carbonyl compound, a further subject of the invention comprises a process for preparing adhesion promoters according to any one of the claims 1 through 10, wherein the unsaturated dicarboxylic acids and/or the anhydrides thereof are at least partially esterified by charging them into a primary $C_1$-$C_6$ alcohol at elevated temperatures, and the functional polymer is dissolved in the same alcohol or in an aromatic solvent, whereafter the two solutions are combined and adjusted to a solids content of preferably not in excess of 30% by weight and to a ratio of dicarboxylic acid derivatives to the polymer of about 1:50 to 1:2, and preferably of from 1:5 to 1:15.

Thus, for example, maleic anhydride may be dissolved in isopropanol at boiling temperature for a period of from 0.5 to 2 hours and, upon cooling, may be combined with the solution of a polyamide containing amino groups and having been derived from dimer fatty acid in isopropanol. It is convenient in this procedure to adjust the concentration of the carbonyl compound as set forth above and to adjust the concentration of the polyamide to values of from 5 to 20% by weight, based on the total formulation.

The adhesion promoters according to the invention may be applied to the surface by dipping, spreading, knife-coating, roller-coating or similar methods. The volatilization of the solvent is followed by a step of thermal activation, whereupon adhesion-bonding may be carried out. Suitable as adhesives are hot-applicable adhesives or those developing heat when curing or are applied in the molten state. Preferred are hot-melt adhesives, e.g. hot-melt adhesives based on ethylenevinylacetate, polyester, polyamides, polyolefins or mixtures of polymers. Particularly preferred are polyamide hot-melt adhesives, e.g. those listed in the German patent applications DE 31 11 226, DE 31 11 206, DE 35 31 941, DE 35 35 732, DE 35 04 804, DE 37 25 486, and DE 38 03 524 listed hereinabove.

The activation by heat of the adhesion promoter may be effected by coating the substrate and then heating same in an oven at a temperature of more than 120° C. up to about 140° C. for a few minutes. Then any optional cold-applicable adhesives may be employed, e.g. epoxide adhesives, polyurethanes etc.. However, in a preferred embodiment of the invention heat activation of the adhesion promoter is effected by the heat inherent to the hot-melt adhesive. It is possible that gelation of the adhesion promoter is caused to occur due to the application of the hot melt; then functional groups of the hot-melt adhesive may react with functional groups of the adhesion promoter, so that thereby bonds are formed between the adhesion promoter and the hot melt adhesive, on the one hand, and the substrate and the adhesion promoter, on the other hand.

A further subject matter of the invention relates to the use of the adhesion promoter according to the invention for the surface treatment of polymer fibers.

The solids content of the adhesion promoter solutions employed according to the invention as surface treatment agents is from 0.5 to 40% by weight, and preferably from 0.5 to 15% by weight.

The adhesion promoter solutions employed according to the invention are not in any case true physical solutions. Without drawback in the properties, portions of the polymers mixed with one another may be present in dispersed swollen or non-swollen form. In such a case settling is to be prevented during use. As the solvents, there may be used the solvents as common for the polyamides derived from dimer fatty acid such as, for example, mixtures of $C_1$- to $C_{12}$-alcohols, and especially of $C_1$- to $C_4$-alcohols, preferably in admixture with hydrocarbons. A particularly beneficial solvent system consists of isopropanol and toluene, for example in a ratio by weight of 9:1.

According to the invention, polymer fibers of various types may be coated. Thus, coated fibers of, more specifically, organic polymers, i.e. of polymerizates as well as of condensates, may be produced. Particularly important coated fibers are fibers made of polyamides, polyesters, polyimides and/or polyethers, that is those based on aromatic and/or aliphatic basic structural elements.

Within the scope of the invention, coated aromatic polyamide fibers are of particular importance. The term "aromatic polyamide fibers" as used herein is understood to quite generally denote fibers (continuous filaments, staple fibers, fiber tows, yarns, pulps, mixed fibers, fibers having a special surface structure and the like, or flat textile fabrics) made of aromatic polyamides having a fibrous structure. The term "aromatic polyamides" is understood to mean polymers which partially, predominantly or exclusively consist of aromatic rings connected to one another by carbonamide bridges and, optionally, also additionally by other bridging members. The structure of those aromatic polyamides may be in part illustrated by the following general formula:

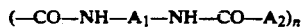

$(-CO-NH-A_1-NH-CO-A_2)_n$ wherein $A_1$ and $A_2$ represent aromatic and/or heterocyclic rings which may also be substituted. An important class of surface-modified fibers according to the invention is derived from wholly aromatic copolyamides.

Examples for those aromatic polyamides are: Poly-m-phenylene-isophthalamide, trade name of Nomex ® (U.S. Pat. No. 3,287,324), poly-p-phenylene-terephthalamide, trade name of Kevlar ® (DE 22 19 703). Further suitable are polyamides of this structure wherein at least one of the phenylene groups bears one or more substituents, e.g. lower alkyl groups, alkoxy groups or halogen atoms. Further aromatic polyamides contain at least moieties derived from 3-aminobenzoic acid or 4-aminobenzoic acid, respectively.

Suitable for the modification by means of the surface treatment agents are those wholly aromatic polyamide fibers which have been drawn in a nitrogen atmosphere at a temperature in excess of 150° C. according to DE 22 19 646.

Furthermore, also suitable are aromatic polyamides which contain diaminodiphenylene groups, wherein two phenyl residues each bearing an amino or carboxyl group are connected to each other through a bridging member, e.g. a hetero atom (O, S), $SO_2$, NR, $N_2$ or a group $CR_2$ (with R=H or an alkyl group) or a group CO). Finally, also suitable are aromatic polyamides, wherein some of the aromatic rings have been replaced by heterocycles or which comprise heterocycles as substituents or chain members, and fibers according to the U.S. Pat. No. 4,075,172 marketed under the trade name of Technora ®.

The surface treatment agents according to the invention may be employed in different stages of the fiber production. Thus, the surface treatment agents may be applied onto the never dried moist fiber (on line), or they may be applied onto the dried fiber (off line). It is preferred to apply the surface treatment agent after drying and, if desired, after drawing. This is in particular applicable to aramid fibers.

For the application to the fiber the conventional applicators may be used. These are, for example, metering application systems, roller coating systems or baths.

Prior to, during or after the application an ultrasonic treatment, an electrostatic treatment or a plasma treatment of the yarn may be carried out. In some cases this will be preferred to improve the penetration of the treatment agent. In all events the suitable equipment as common for the use with solvent-containing formulations may be employed here. The amount to be coated on the fiber is from 0.01 to 12% by weight, based on the fiber weight.

The fiber may be dried before or after coating and may optionally also be coated in several layers, i.e. be dried after a first coating step and then once more be coated in a further bath. The drying process may be carried out by employing convection (for example hot air), heat conduction (e.g. contact drying), radiation (e.g. infrared) or the like. The heat treatment of the fiber is usually conducted within a range of from 80° C. to 220° C., while the higher temperatures within said range can be employed only with thermally stable fibers, for example with aramid fibers. The time of drying may vary from a few seconds to several minutes, dependent on the degree of drying to be attained and on the further intended use of the fiber. The running speed of the fiber or yarns in the coating apparatus may be selected between a few meters per minute and some hundreds of meters per minute, dependent on the desired amount of product uptake, an upper limit of the running speed being about 850 m/min. Typical values of the running speed may be between 750 and 825 m/min, while it is to be observed that a lower limit of the drying time of about 5 seconds is to be maintained.

The fibers modified on their surfaces according to the invention are useful for a variety of applications. For example, in cold-setting adhesion procedures they exhibit an improved substrate adhesion; however, they may also be embedded in synthetic materials (plastics) or included by vulcanization in rubber, whereupon the fibers exhibit an improved binding power to polar as well as apolar rubber types.

EXAMPLES

The polyamides employed for the preparation of the following adhesion promoters had the following compositions:

| Example 1: Polyamide | |
| --- | --- |
| Dimer fatty acid | 59.0% by wt. |
| Stearic acid | 1.0% by wt. |
| Azelaic acid | 17.0% by wt. |
| Diaminoethane | 3.2% by wt. |
| Piperazine | 19.8% by wt. |
| Amine value | 3.5 |
| Softening point | 140° C. |
| Example 2: Polyamide | |
| Dimer fatty acid | 76.4% by wt. |
| Azelaic acid | 5.2% by wt. |
| Diaminoethane | 7.6% by wt. |
| N-Alkyl-propylenediamine (Alkyl = Stearyl) | 10.8% by wt. |
| Amine value | 3.2 |
| Softening point | 140° C. |
| Example 3: PA-Copolymer containing polyether blocks | |
| Dimer fatty acid | 72.6% by wt. |
| Stearic acid | 7.8% by wt. |
| Diaminoethane | 7.9% by wt. |
| Bis-(3-aminopropyl)poly-tetrahydrofuran (MW 1100) | 11.7% by wt. |
| Amine value | 5.5 |
| Softening point | 100° C. |

The dimer fatty acid employed is characterized as follows: Monomer content 1%, trimer content 4%.

For the preparation of the adhesion promoters, the polyamides are dissolved at 20% by weight in isopropanol with heating; then a solution of 10% by weight of maleic anhydride in isopropanol is separately prepared and kept boiling under reflux for about 1 hour. After cooling to room temperature, the solutions are mixed and supplemented with toluene in accordance with the formulation.

| Example 4: Adhesion Promoter Composition: | |
| --- | --- |
| Polyamide of Example 1 | 10% by wt. |
| Maleic anhydride | 1% by wt. |
| Solvent* | 89% by wt. |
| Example 5: Adhesion Promoter Composition: | |
| Polyamide of Example 2 | 12% by wt. |
| Maleic anhydride | 1% by wt. |
| Solvent* | 87% by wt. |
| Example 6: Adhesion Promoter Composition: | |
| Polyamide of Example 3 | 8% by wt. |
| Maleic anhydride | 1% by wt. |
| Solvent* | 91% by wt. |

*Solvent in each of the Examples: Isopropanol/toluene 17.5:1 (ratio by weight).

The metal test specimens were treated with the adhesion promoters according to the Examples 4 to 6 by spreading with a paint brush or sponge. Upon volatilization of the solvent the test specimens may be used for adhesion-bonding.

Preparation of the test specimens and test parameters

Foils or films of the materials to be bonded (metals, plastics) were formatted to dimensions of 10 cm × 10 cm. Between these areas there are positioned side by side a) a film of an adhesive of 7 cm × 10 cm which has a thickness of greater than 100 % thicker than the residual film thickness after the fusion process, i.e. an adhesive film is applied which first is somewhat thicker and shrinks upon the fusion operation (cf. DIN 53531);

b) a polytetrafluoroethylene film of 3 cm × 10 cm the thickness of which must be smaller than the expected residual film thickness.

Besides these test specimens there are positioned spacer sheets the thickness of which after calculation ensures the desired adhesive layer thickness to be achieved after heating and pressing.

The above-described still unbonded composite is compressed above the softening range of the adhesive.

After cooling, the polytetrafluoroethylene film is removed, and the test specimen of 2.5 cm × 10 cm is formatted so that the resulting tensile peel area is 7 cm × 10 cm.

The tensile peel force is measured in N/25 at a peel rate of 50 mm/min.

TABLE 1

Tensile peel strength in N/25 mm of various substrates difficult to bond with and without an adhesion promoter
Adhesive: Polyamide according to Example 1

| | Adhesion promoter Example 4 | Adhesion promoter Example 5 | Adhesion promoter Example 6 | Without adhesion promoter |
| --- | --- | --- | --- | --- |
| Steel 1405 | 200 | 230 | 160 | 60 |
| Steel, zinc-plated | 290 | 210 | 340 | 130 |
| Aluminum, chromated | 362 | 305 | 185 | 165 |
| Copper | 200 | 95 | 110 | 80 |

TABLE 2

Tensile peel strength in N/25 mm of various substrates difficult to bond with and without an adhesion promoter
Adhesive: Ethylene-Vinyl acetate-Copolymer
Softening point: 95° C. (ASTM E 28)
Viscosity: 40 Pa s (ASTM D 3236, Brookfield) at 160° C.
Designation: Macromelt ® Q 3261

| | Adhesion promoter Example 4 | Without adhesion promoter |
| --- | --- | --- |
| Steel 1405 | 165 | 40 |
| Steel, zinc-plated | 125 | 68 |
| Aluminum, chromated | 130 | 62 |
| Copper | 145 | 80 |

EXAMPLE 7

For the treatment of aramid fibers, solutions having solids contents of between 0.5 and 11% by weight were prepared. Hereinbelow, a solution having a solids content of 5% by weight was employed.

Tests of aramid fibers

An aramid yarn of the type p-phenylenediamine terephthalamide, after drying, is passed through a bath (3% by weight solids content) of the surface treatment agent according to Example 4 (adhesion promoter) to be employed according to the invention and subsequently dried at about 120° C. The yarn had an initial tension of 0.6 daN. It was an untwisted yarn of 1670 dtex. The yarn is passed through the immersion bath at a velocity of about 30 m/min. The coefficients of friction to various materials were determined at room temperature (apparatus: Rothschild F Meter R 1112). The coefficient of friction fiber-to-fiber was 0.10, the coefficient of friction fiber-to-metal was 0.40, the coefficient of friction fiber-to-ceramics was 0.33. For a standard-finished yarn (Kevlar ® 29) the values were 0.11 (fiber-to-fiber), 0.54 (fiber-to-metal); 0.38 (fiber-to-ceramics).

Knitting trials with treated yarns

Aramid yarns (Kevlar ®) were knitted on an ELHA ® circular knitting machine (Model RRU). The test lasted 4 hours. The machine speed was 670 min$^{-1}$, and the knitting speed was 15 m/min. In contrast to untreated fibers, no wear was observed. The appearance of the knitted goods was uniform. Furthermore, no deposits were formed on the knitting machine. This means that the surface treatment agents of the invention clearly improves the knittability of aramid yarns. In a standard-finished Kevlar yarn, fibrillation and deposits on the knitting machine were observed.

What is claimed is:

1. A heat-activatable adhesion promoter for treating the surfaces of metals or synthetic materials (plastics) prior to bonding, which adhesion promoter contains from 0.1 to 10% by weight of a carbonyl compound having at least one activated double bond
   from 5 to 30% by weight of a polycondensate having functional groups,
   from 0 to 10% by weight of further auxiliary materials, as well as
   one or more organic solvent(s) to make 100% by weight.

2. The adhesion promoter according to claim 1, wherein the carbonyl compound contains an α-β double bond and is selected from the group of unsaturated dicarboxylic acids and the nitrile, amide, ester and anhydride derivatives thereof.

3. The adhesion promoter of claim 1, characterized in that esters and/or semi-esters of unsaturated dicarboxylic acids wherein at least one carbonyl group is in conjugation with the double bond are contained as the carbonyl compound.

4. The adhesion promoter of claim 1, characterized in that esters and/or semi-esters of maleic acid with primary $C_1$- to $C_6$-alcohols are contained as the carbonyl compound.

5. The adhesion promoter according to any one of claims 1 to 4, wherein the polycondensates have functional groups selected from carboxylic acid groups, amino groups and hydroxyl groups.

6. The adhesion promoter according to any one of claims 1 to 4 wherein the polycondensate is selected from the group of polyesters and polyamides substituted with functional groups selected from amino groups, carboxylic acid groups and hydroxyl groups.

7. The adhesion promoter according to any one of claims 1 to 4, characterized in that polyamides derived from dimer fatty acid are present as polycondensates.

8. The adhesion promoter according to any one of claims 1 to 4, characterized in that polyamides derived from dimer fatty acid having an amine value of from 1 to 40, and preferably of from 2 to 9, are present as polycondensates.

9. The adhesion promoter according to any one of claims 1 to 4 characterized in that a solvent selected from the group of $C_1$–$C_6$ alcohols and mixtures of $C_1$–$C_6$ alcohols with higher-boiling aromatic or aliphatic hydrocarbons is present.

10. The adhesion promoter according to any one of claims 1 to 4, characterized in that stabilizers, antioxidants, dyes, plasticizers and thickening agents are present as auxiliary materials.

11. A process for preparing adhesion promoters according to any one of claims 1 to 4, characterized in that the unsaturated dicarboxylic acids and/or the anhydrides thereof are at least partially esterified by charging them into a primary $C_1$–$C_6$ alcohol at elevated temperatures, and the functional polycondensate is dissolved in the same alcohol or in an aromatic solvent, whereafter the two solutions are combined and adjusted to a solids content not in excess of 30% by weight and to a ratio of dicarboxylic acid derivatives to the polycondensate of about 1:50 to 1:2, and preferably of from 1:5 to 1:15.

12. The process according to claim 11, characterized in that maleic anhydride is dissolved in isopropanol at the boiling temperature for a period of from 0.5 to 2 hours and, upon cooling, the solution is combined with the solution of a polyamide containing amino groups and derived from dimer fatty acid in isopropanol.

13. A polymer fiber containing at least portionwise a surface treatment agent according to any one of claims 1 to 4.

14. The polymer fiber according to claim 13, characterized in that it is composed of polyamides, polyesters, or polyimides.

15. The polymer fiber of claim 13, characterized in that it is composed of aromatic polyamides.

16. The polymer fiber of claim 13, characterized in that the amount of coating agents is from 0.01 to 12% by weight, based on the fiber weight.

17. A process for modifying polymer fibers, characterized in that the fiber of claim 13 is treated by using an adhesion promoter solution, wherein said fiber before or after the first drying is immersed in a bath charged with the adhesion promoter solution.

* * * * *